United States Patent
Kofler

(10) Patent No.: US 7,289,028 B2
(45) Date of Patent: Oct. 30, 2007

(54) TRANSPONDER WITH TWO SUPPLY VOLTAGES

(75) Inventor: Robert Kofler, Graz-Kroisbach (AT)

(73) Assignee: NXP B.V., Eindhoven (NL)

( * ) Notice: Subject to any disclaimer, the term of this patent is extended or adjusted under 35 U.S.C. 154(b) by 261 days.

(21) Appl. No.: 10/522,845

(22) PCT Filed: Jul. 18, 2003

(86) PCT No.: PCT/IB03/03279

§ 371 (c)(1),
(2), (4) Date: Jan. 28, 2005

(87) PCT Pub. No.: WO2004/013807

PCT Pub. Date: Feb. 12, 2004

(65) Prior Publication Data

US 2005/0242790 A1    Nov. 3, 2005

(30) Foreign Application Priority Data

Jul. 30, 2002  (EP) ................................. 02102075

(51) Int. Cl.
*G08B 13/14* (2006.01)
(52) U.S. Cl. ............... 340/572.4; 340/653; 375/268
(58) Field of Classification Search ............ 340/539.3, 340/572.4, 635, 644, 645, 646, 653, 657; 375/268; 365/145, 191, 192; 235/492; 327/538
See application file for complete search history.

(56) References Cited

U.S. PATENT DOCUMENTS

| 6,031,413 A * | 2/2000 | Mizoguchi ................... 327/538 |
| 6,304,613 B1 * | 10/2001 | Koller et al. ............... 375/268 |
| 6,515,919 B1 * | 2/2003 | Lee ............................ 365/192 |
| 6,809,952 B2 * | 10/2004 | Masui ........................ 365/145 |
| 2001/0052798 A1 | 12/2001 | Ully et al. |
| 2002/0054653 A1 | 5/2002 | Zettler |

FOREIGN PATENT DOCUMENTS

EP          1 306 741       5/2003

\* cited by examiner

*Primary Examiner*—Van T. Trieu

(57) ABSTRACT

In a transponder (1) and an integrated circuit (5), the integrated circuit (5) has two circuit sections (18, 19) that are arranged for supply with two supply voltages of different levels (VL-HV, VL-LV), a first rectifier circuit (20) and a limiter stage (21) connected downstream of the first rectifier circuit (20) being provided, from which limiter stage (21) the higher, first supply voltage (VL-HV) for the first circuit section (18) can be picked off, and a second rectifier circuit (23) and a control stage (24) to control said second rectifier circuit (23) being provided, from which second rectifier circuit (23) the lower, second supply voltage (VL-LV) for the second circuit section (19) can be picked off without passing through an intervening limiter stage.

4 Claims, 1 Drawing Sheet

TRANSPONDER WITH TWO SUPPLY VOLTAGES

Figure 1:
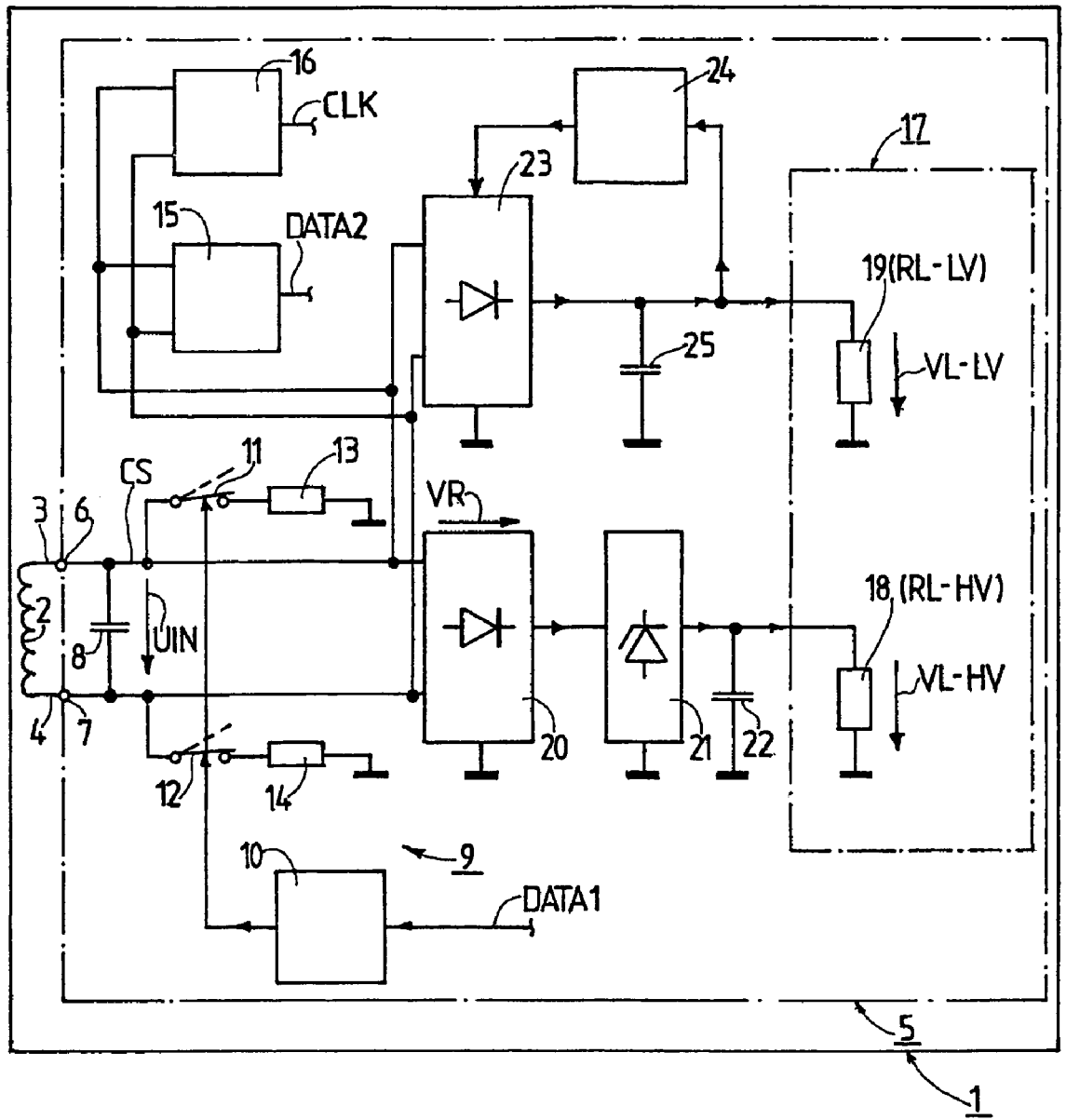

The invention relates to a transponder that is arranged for non-contacting communication with a communication station and that has transmission means and that has an integrated circuit with circuit connecting contacts, wherein the transmission means are connected to the circuit connecting contacts and an input voltage can be picked off from said circuit connecting contacts, wherein first rectifier means and limiter means cooperating with said first rectifier means are provided, wherein a voltage representing the input voltage can be fed to the first rectifier means, and wherein a first supply voltage can be picked off from the first rectifier means or from the limiter means.

The invention further relates to an integrated circuit that is intended for use in a transponder for non-contacting communication with a communication station, which transponder is arranged as detailed in the first paragraph.

A transponder of the kind detailed in the first paragraph and an integrated circuit of the kind detailed in the second paragraph have become commercially available in a number of variant versions and are therefore known. In connection with a transponder of this kind, reference may also be made to U.S. Pat. No. 6,168,083 B1.

In the known transponder that has been put on the market, the design of the integrated circuit is such that only the first supply voltage is required for supplying the integrated circuit, which first supply voltage is generated by means of the first rectifier means and the limiter means connected downstream of the first rectifier means, use being made for this purpose of the input voltage that arises at the circuit connecting contacts, which input voltage originates from a load-modulated carrier signal when the transponder is in a transmitting mode and from an amplitude-modulated carrier signal when it is in a receiving mode.

In the field of transponders, the direction in which development is moving is that, to produce an integrated circuit for a transponder of this kind, increasing frequent use is being made of integration processes involving shorter and shorter channels lengths, which has the advantage that even circuits of relatively complicated design can be produced in the form of integrated circuits that are very small in area and hence inexpensive. However, going hand in hand with this is the fact that, compared with what was true earlier and hitherto, it is only lower maximum supply voltages that are permitted for a part of an integrated circuit but there are also circuit components, and particularly memories such as an EEPROM, present in an integrated circuit of this kind that still require a relatively high supply voltage. In the known data carrier, the relatively low supply voltage could be generated by generating it in a separate supply-voltage generating circuit having a rectifier circuit and a limiter circuit connected downstream of the rectifier circuit, but this meant that only a relatively low input voltage could be obtained at the circuit connecting contacts, which resulted in a reduced modulation spectrum and hence a reduced range of communication when the transponder was in the transmitting mode, which is of course undesirable.

It is an object of the invention to solve the above problems in an easy way and to produce an improved transponder and an improved integrated circuit for such a transponder.

To achieve the object stated above, features according to the invention are provided in a transponder according to the invention such that a transponder according to the invention can be characterized as follows, namely:

A transponder that is arranged for non-contacting communication with a communication station and that has transmission means and that has an integrated circuit with circuit connecting contacts, wherein the transmission means are connected to circuit connecting contacts and an input voltage can be picked off from said circuit connecting contacts, wherein the integrated circuit has a first circuit section and a second circuit section, wherein the first circuit section is arranged for being supplied with a first supply voltage and the second circuit section is arranged for being supplied with a second supply voltage, wherein first rectifier means and limiter means cooperating with said first rectifier means are provided, wherein a voltage representing the input voltage can be fed to the first rectifier means, wherein the first supply voltage can be picked off from the first rectifier means or from the limiter means, wherein second rectifier means and control means for controlling said second rectifier means are provided, wherein a voltage representing the input voltage can also be fed to the second rectifier means, wherein the second supply voltage can be picked off from the second rectifier means, and wherein the value of the second supply voltage that can be picked off from the second rectifier means can be controlled by the control means.

To achieve the object stated above, features according to the invention are provided in an integrated circuit according to the invention such that an integrated circuit according to the invention can be characterized as follows, namely:

An integrated circuit that is intended for use in a transponder for non-contacting communication with a communication station and that has circuit connecting contacts that are intended for connection to transmission means of the transponder, from which contacts an input voltage can be picked off, and that has a first circuit section and a second circuit section, wherein the first circuit section is arranged for being supplied with a first supply voltage and the second circuit section is arranged for being supplied with a second supply voltage, wherein first rectifier means and limiter means cooperating with said first rectifier means are provided, wherein a voltage representing the input voltage can be fed to the first rectifier means, wherein the first supply voltage can be picked off from the first rectifier means or from the limiter means, wherein second rectifier means and control means for controlling said second rectifier means are provided, wherein a voltage representing the input voltage can also be fed to the second rectifier means, wherein the second supply voltage can be picked off from the second rectifier means, and wherein the value of the second supply voltage that can be picked off from the second rectifier means can be controlled by the control means.

What is achieved by the provision of the features according to the invention, in a manner which is simple in terms of circuitry, is that, in a transponder according to the invention and in an integrated circuit according to the invention, both a higher, first supply voltage and a lower, second supply voltage can be generated and that, despite the generation of the lower, second supply voltage, a wide modulation spectrum is ensured that is independent of the lower, second supply voltage and is dependent only on the higher, first supply voltage obtained by means of the limiter means, and a long range of communication is thus ensured when the transponder is in a transmitting mode. The generation of the lower, second supply voltage also produces the major advantage that the section of the circuit that is arranged for supply with the lower, second supply voltage also draws only a smaller supply current, which means that, overall, the power consumption of this section of the circuit, and hence of the integrated circuit and of the transponder, is low. The generation of the lower, second supply voltage also produces another advantage, namely that a back-up capacitor that is produced by integrated circuit technology and at which this lower, second supply voltage arises can be made relatively small in terms of area.

In a transponder according to the invention and in an integrated circuit according to the invention, the control means may be arranged to control the value, i.e. the amplitude, of the lower, second supply voltage as a function of the value, i.e. the amplitude, of the input voltage that can be picked off from the circuit connecting contacts. It has however proved particularly advantageous if, in a transponder according to the invention and in an integrated circuit according to the invention, the features claimed in claim 2 and in claim 4 are also provided in the respective cases. An arrangement of this kind has proved advantageous with regard to particularly accurate control of the value of the lower, second supply voltage. The output voltage or the output current from the second rectifier means can be used as an output variable in this case.

These and other aspects of the invention are apparent from and will be elucidated with reference to the embodiment described hereinafter, though the invention is not limited to this embodiment.

In the drawings:

FIG. 1 is a block circuit diagram that shows, in a highly diagrammatic form, a part of a transponder, and of an integrated circuit for the said transponder, that is essential in the present connection, according to one embodiment of the invention.

FIG. 1 shows a transponder 1. The transponder 1 is in the form of a tag or label. The transponder 1 may however also be in the form of a card-like data carrier. The transponder 1 is intended and arranged for non-contacting communication with a communication station (not shown). For this purpose, the transponder 1 has transmission means 2 that are formed in the present case by a transmission coil 2 that, in an inductive manner, i.e. in the manner employed in a transformer, can enter into working connection with a transmission coil of the communication station (not shown), to allow a transmission to be made. Transmission means that operate capacitively may be provided in place of the transmission coil 2. The transmission means may also be formed by a dipole or monopole, particularly when transmission takes place at very high frequencies in the MHz or GHz range. The transmission coil 2, i.e. the transmission means 2, has a first transmission-means connecting contact 3 and a second transmission-means connecting contact 4. The transmission means may also have more than two transmission-means connecting contacts.

The transponder 1 also contains an integrated circuit 5. The integrated circuit 5 has a first circuit connecting contact 6 and a second circuit connecting contact 7. Other circuit connecting contacts are not shown. The first circuit connecting contact 6 has an electrically conductive connection to the first transmission-means connecting contact 3 and the second circuit connecting contact 7 has an electrically conductive connection to the second transmission-means connecting contact 4. Because a transmission coil 2 is provided as the transmission means in the present case, there is connected to the two circuit connecting contacts 6 and 7 a capacitor 8 that is produced in the integrated circuit 5 and that forms a resonant circuit with the transmission coil 2. The capacitor 8 may also be provided outside the integrated circuit 5. The resonant frequency of the resonant circuit is matched in the present case to the frequency of a carrier signal CS, but this need not necessarily be the case. When the transponder 1 is in a transmitting mode, the carrier signal CS is received from the communication station (not shown) in an unmodulated form and is load-modulated by the transponder 1. When the transponder 1 is in a receiving mode, the carrier signal CS is emitted in amplitude-modulated form by the communication station (not shown). Rather than amplitude modulation, use may also be made of frequency modulation or phase modulation. Both in its load-modulated form and in its amplitude-modulated form and its unmodulated form, the carrier signal CS produces an input voltage UIN that can be picked off from the two circuit connecting contacts 6 and 7.

To allow the unmodulated carrier signal CS to be load-modulated, the transponder 1 and the integrated circuit 5 have load-modulating means 9 that are connected to the two circuit connecting contacts 6 and 7. The load-modulating means 9 have a load-modulation control circuit 10 and two electronic switches 11 and 12 that can be controlled by the load-modulation control circuit 10, with a first resistor 13 being connected in series with the first switch 11 and a second resistor 14 being connected in series with the second switch 12. First data DATA1 in coded form can be fed to the load-modulation control circuit 10, which results in the load-modulation control circuit 10 exerting control on the two switches 11 and 12 as a function of the first data DATA1 fed to it, which causes the two switches 11 and 12 to open and close as a function of the first data DATA1, which in turn results in the unmodulated carrier signal CS being load-modulated by the opening and closing of the two switches and by the switching in and out of the two resistors 13 and 14 that occurs as a result of this. There are other possible designs of circuit for effecting the load-modulation, such for example as one having only one electronic switch and one resistor or having a capacitor instead of the resistor.

To allow an amplitude-modulated carrier signal CS that is received by means of the transmission coil 2 to be demodulated, the transponder 1 and the integrated circuit 5 have a demodulating circuit 15 that is likewise connected to the two circuit connecting contacts 6 and 7. Demodulation of the amplitude-modulated carrier signal CS can be performed by means of the demodulating circuit 15, which results in the demodulating circuit 15 emitting second data DATA2, this second data DATA2 still being in coded form.

Also connected to the two circuit connecting contacts 6 and 7 is a clock-signal regeneration circuit 16 by means of which a clock signal CLK can be regenerated from the carrier signal CS. It is however also possible for a clock-signal generator, with which a clock signal can be generated independently of a carrier signal, to be provided in place of the clock-signal regeneration circuit 16.

The transponder 1 and the integrated circuit 5 also contain a microcomputer 17. A hard-wired logic circuit may also be provided in place of the microcomputer 17. The microcomputer 17 contains memory means (not shown). The microcomputer 17 is intended and arranged to process first data DATA1 to be read out, which data DATA1 is stored in the memory means (not shown), and to process second data DATA2 to be stored. The microcomputer 17 contains a first circuit section 18 and a second circuit section 19. The two circuit sections 18 and 19 are intended and arranged to process data or signals, with the first circuit section 18 being intended and arranged mainly, but not exclusively, to process analog signals and the second circuit section 19 being intended and arranged mainly, but not exclusively, to process digital signals. The first circuit section 18 and the second circuit section 19 each comprise a large number of circuit assemblies. The first circuit section 18 may contain the above-mentioned memory means for example. The two circuit sections 18 and 19 are merely shown diagrammatically in FIG. 1 in the form of load resistors having resistances RL-HV and RL-LV respectively.

In the transponder 1 and the integrated circuit 5, the first circuit section 18 is arranged for being supplied with a first supply voltage VL-HV. The second circuit section 19 is arranged for being supplied with a second supply voltage VL-LV. In most of the circumstances under which the transponder 1 operates, namely when the transponder 1 is relatively close to a communication station and is communicating therewith, the second supply voltage VL-LV is lower in this case than the first supply voltage VL-HV.

To generate the first supply voltage VL-HV that is higher in most of the circumstances under which the transponder 1 operates, the transponder 1 and the integrated circuit 5 have first rectifier means 20 and limiter means 21 connected downstream of said first rectifier means 20. Connected downstream of the limiter means 21 in this case is a first storage capacitor 22 that acts as a means of storing energy. An arrangement where there is no such storage capacitor may also be implemented. The first rectifier means 20 comprise a bridge rectifier in this case but they may also be implemented in some other way. The limiter means 21 are implemented by using a Zener diode. Limiter means 21 of this kind have long been known. Such limiter means may also take the form of a so-called shunt regulator. A voltage representing the input voltage UIN can be fed to the first rectifier means 20, the input voltage UIN being fed directly to the rectifier means 20 in the transponder 1 shown in FIG. 1. This need not necessarily be the case however, because a voltage that is reduced in comparison with the input voltage UIN may also be fed to the first rectifier means 20. The input voltage UIN is rectified by the first rectifier means 20, after which limitation to the desired higher, first supply voltage VL-HV takes place by means of the limiter means 21. In the transponder 1 and the integrated circuit 5, the maximum voltage UIN at the circuit connecting contacts 6 and 7 is determined essentially by the sum of the voltage drop VR across the first rectifier means 20 and the higher, first supply voltage VL-HV. In the case of the solution that was produced in the course of developing the transponder 1 and the integrated circuit 5, the maximum higher, first supply voltage was selected to be approximately 5.5 V, thus giving, with a voltage drop of approximately 1 V across the first rectifier means 20, a maximum input voltage UIN of 6.5 V, namely in the case where the input voltage UIN is produced by the unmodulated carrier signal CS. When the transponder 1 is in a transmitting mode, the unmodulated carrier signal is, as already mentioned, subjected to load modulation by the load-modulating means 9, a load then being applied to the unmodulated carrier signal CS by the resistors 13 and 14 when the switches 11 and 12 are closed, which results in a reduced amplitude being obtained for the carrier signal CS. The reduced amplitude of the carrier signal CS is independent in this case of the amplitude of the unmodulated carrier signal CS. Due to the fact that the unmodulated carrier signal CS, and hence the input voltage UIN, is higher than the higher, first supply voltage VL-HV by the voltage drop VR across the first rectifier means 20, a relatively high input voltage UIN can be obtained in the case of an unmodulated carrier signal CS, which in turn results in a high modulation spectrum. A high modulation spectrum of this kind has the advantage that communication by the transponder 1 with a communication station becomes possible over a relatively long communication range.

To generate the second supply voltage VL-LV that is lower in most of the circumstances under which the transponder 1 operates, the transponder 1 and the integrated circuit 5 have second rectifier means 23, and control means 24 to control said second rectifier means 23. Connected to the output of the second rectifier means 23 is a second storage capacitor 25 that is intended for energy storage purposes. The second rectifier means 23 comprise controlled diodes in this case. The second rectifier means 23 may however also be implemented in some other way, such as with a controlled bridge rectifier for example. A voltage representing the input voltage UIN can also be fed to the second rectifier means 23, the input voltage UIN being fed directly to the second rectifier means 23 in this case too. In the case of the second rectifier means 23 too, this need not necessarily be the case, because a voltage that is reduced, or even raised, in comparison with the input voltage UIN may also be fed to the second rectifier means 23. A raised voltage of this kind may for example be generated by means of a voltage doubling circuit. The lower, second supply voltage VL-LV is generated by the second rectifier means 23. The lower, second supply voltage VL-LV can be picked off from the second rectifier means 23 and fed to the second circuit section 19 without passing through any intervening limiter means, i.e. unlike the normally higher, first supply voltage VL-HV. The control means 24 are arranged in the present case to control the value, i.e. the amplitude, of the lower, second supply voltage VL-LV as a function of the value, i.e. the amplitude of the lower, second supply voltage VL-LV that arises at the output of the second rectifier means 23. By means of the control means, the second rectifier means 23 are controlled in such a way that the amplitude of the second supply voltage VL-LV that can be picked off from the second rectifier means 23 is controlled, this control being such that the usually lower, second supply voltage VL-LV always lies within a given range of voltages.

Due to the fact that the second rectifier means 23 do not have any limiter means connected downstream of them, the advantage is obtained that the lower, second supply voltage VL-LV cannot have any disadvantageous, namely reducing, effect on the input voltage UIN, which means that the input voltage UIN is dependent only on the higher, first supply voltage VL-HV. This gives the major advantage in the case of the transponder 1 and the integrated circuit 5 that the second circuit section 19 can be supplied with a lower, second supply voltage VL-LV, which is advantageous with regard to having a power consumption that is as low as possible, but that a high modulation spectrum can be obtained in the region of the circuit connecting contacts 6 and 7, which means that the transponder 1 has a long range of communication that is determined essentially by the higher, first supply voltage VL-HV and is not adversely, namely reducingly, affected by the lower, second supply voltage VL-LV.

It should be explicitly mentioned that operating situations may also occur in the transponder 1 and in the integrated circuit 5 in which the voltage of the usually lower, first supply voltage VL-LV is of a higher value than that of the usually higher, first supply voltage VL-HV. This happens particularly when the transponder 1 is communicating with a first communication station from relatively far away from the communication station, in which case there is then only a relatively low input voltage.

Only a first circuit section 18 and a second circuit section 19 are provided in the transponder 1 and the integrated circuit 5 that have been described with reference to FIG. 1. It should be mentioned that a transponder of this kind may also comprise at least one further circuit section, which has to be supplied with a further supply voltage that is lower than the first supply voltage VL-HV. A supply voltage of this kind may for example be generated by using the second supply voltage VL-LV, by means of a so-called in-phase regulator.

In the transponder 1 shown in FIG. 1 and the integrated circuit 5 shown in FIG. 1, the limiter means 21 cooperating with the first rectifier means 20 are connected downstream of the first rectifier means 21. This need not necessarily be the case, because it is also possible to have designs of circuit in which the limiter means are connected upstream of the rectifier means, in which case the higher, first supply voltage VL-HV is then picked off from the rectifier means.

The invention claimed is:

1. A transponder that is arranged far non-contacting communication with a communication station and that has transmission means and that has an integrated circuit with circuit connecting contacts, wherein the transmission means are connected to the circuit connecting contacts and an input voltage can be picked off from said circuit connecting contacts, wherein the integrated circuit has a first circuit section and a second circuit section, wherein the first circuit section is arranged for being supplied with a first supply voltage and the second circuit section is arranged for being supplied with a second supply voltage, wherein first rectifier means and limiter means cooperating with said first rectifier means are provided, wherein a voltage representing the input voltage can be fed to the first rectifier means, wherein the first supply voltage can be picked off from the first rectifier means or from the limiter means, wherein second rectifier means and control means for controlling said second rectifier means are provided, wherein a voltage representing the input voltage can also be fed to the second rectifier means, wherein the second supply voltage can be picked off from the second rectifier means, and wherein the value of the second supply voltage that can be picked off from the second rectifier means can be controlled by the control means.

2. A transponder as claimed in claim 1, wherein the control means are arranged to control the value of the second supply voltage as a function of the value of the output variable arising at the output of the second rectifier means.

3. An integrated circuit that is intended for use in a transponder for non-contacting communication with a communication station and that has circuit connecting contacts tat are intended for connection to transmission means of the transponder, from which contacts an input voltage can be picked off, and that has a first circuit section and a second circuit section, wherein the first circuit section is arranged for being supplied with a first supply voltage and the second circuit section is arranged for being supplied with a second supply voltage, wherein first rectifier means and limiter means cooperating with said first rectifier means are provided, to which first rectifier means a voltage representing the input voltage can be fed and from which limiter means the first supply voltage can be picked off, wherein second rectifier means and control means for controlling said second rectifier means are provided, to which second rectifier means a voltage representing the input voltage can also be fed and from which second rectifier means the second supply voltage can be picked off, and by which control means the amplitude of the second supply voltage that can be picked off from the second rectifier means can be controlled.

4. An integrated circuit as claimed in claim 3, wherein the control means are arranged to control the amplitude of the second supply voltage as a function of the amplitude of the output variable arising at the output of the second rectifier means.

* * * * *